STONE & COLE.
Expanding Tap.
No. 16,151.
Patented Dec. 2, 1856.
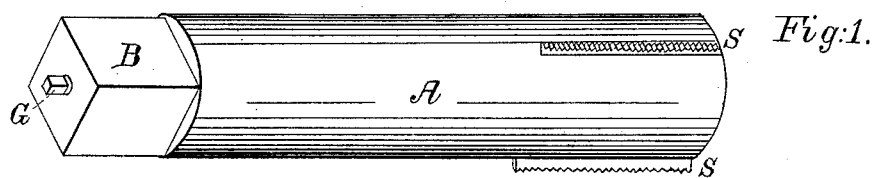
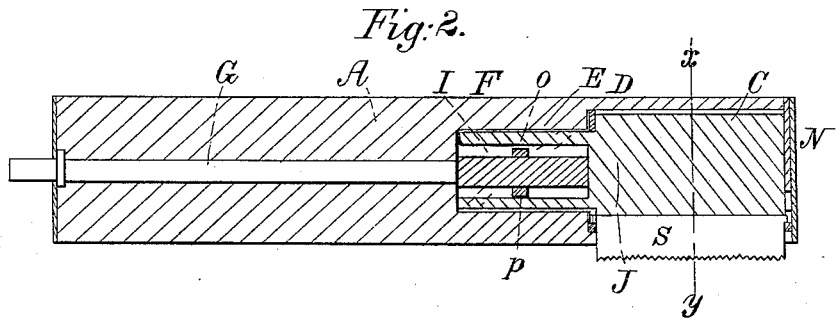
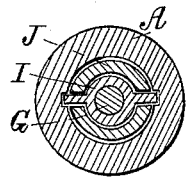
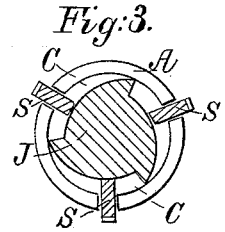

UNITED STATES PATENT OFFICE.

HARLEY STONE, OF UXBRIDGE, AND MASON D. COLE, OF BLACKSTONE, MASSACHUSETTS.

EXPANDING TAP.

Specification of Letters Patent No. 16,151, dated December 2, 1856.

*To all whom it may concern:*

Be it known that we, HARLEY STONE, of Uxbridge, and MASON D. COLE, of Blackstone, both in the county of Worcester and State of Massachusetts, have invented certain new and useful Improvements in Expanding Taps or Reamers; and we do hereby declare that the following is a full, clear, and exact description of the construction and operation of the same, reference being had to the accompanying drawings and to the letters of reference marked thereon, in which drawings Figure 1 is a side view in perspective. Fig. 2 is a longitudinal section through its center. Fig. 3 is a transverse section through the line $x\ y$. Fig. 4 is a transverse section through $o\ p$.

The same letters denote the same parts in all.

To construct our expanding tap the body or case A is made with a square part at B to turn it by, and with a cavity C from its end to D, and a smaller one E from D to F and a hole through the remainder for the rod G to turn in, and also grooves the length of the cavity C or nearly so for the cutters S, S, S. The rod G has a square end to turn it by and a collar to keep it in place and a screw on the other end which reaches nearly to D and has a nut I fitted thereon. The nut I having studs or projections on its ends as seen in Fig. 4, which studs fit and play in spiral grooves cut in the cavity E, and the sides of the nut leaving room for the slotted part of the cam-piece J, which cam-piece is made with a number of volute surfaces corresponding to the number of cutters, and fitting into cavity C, and a part fitting into cavity E which part is divided or slotted to pass the nut I and for that nut to slide in, at the end of the volute surfaces are collars attached to the cam-piece with curved slots corresponding to their surfaces. The cutters S, S, S, are made with lips at each end to fit in the grooves in the collars of the cam piece and are fitted in the slots as grooves in A and have their outer surfaces threaded or toothed to cut the thread, the plate N covering the end of A and inclosing the other parts.

The operation is on turning the rod G one way it moves the nut I the ends of which following the spiral grooves turn it and thus turn the campiece by its slotted part and the cam surfaces force out the cutters S, S, S. And when the rod is turned the other way the nut takes the reverse direction carrying the campiece whose collars draw in the cutters by their lips. While to use the whole the force is applied to A by its square part or similar means; which operates the cutters without expanding them.

It will be seen that our invention applies to taps, reamers and mandrels equally well.

We do not claim making expanding tools by means of cam surfaces irrespective of form and arrangement; but

We claim—

The arrangement of the campiece J the nut I and screw G, and their connection with the cutters and case A, when constructed and operating as above set forth and described.

In testimony whereof we have hereunto set our hands in the presence of two witnesses.

HARLEY STONE.
MASON D. COLE.

Witnesses:
WARREN GASKIN,
DANIEL GUNN.